United States Patent
Wieczorek et al.

(10) Patent No.: US 7,278,363 B2
(45) Date of Patent: Oct. 9, 2007

(54) NON-LAMINATE SEAM

(75) Inventors: Joseph P. Wieczorek, Lake Orion, MI (US); William Collier, Commerce, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 0 days.

(21) Appl. No.: 11/494,329

(22) Filed: Jul. 27, 2006

(65) Prior Publication Data

US 2007/0022931 A1 Feb. 1, 2007

(51) Int. Cl.
*D05B 15/00* (2006.01)
*D05B 35/06* (2006.01)

(52) U.S. Cl. .................. 112/475.06; 112/139; 112/418; 112/470.27

(58) Field of Classification Search ........... 112/470.27, 112/475.06, 139, 149, 142–147, 412, 417, 112/418
See application file for complete search history.

(56) References Cited

U.S. PATENT DOCUMENTS

| 203,300 | A | * | 5/1878 | Stribley ....................... 112/418 |
| 1,999,424 | A | * | 4/1935 | Seitz ........................... 190/119 |
| 2,738,835 | A | * | 3/1956 | Eames .................... 297/452.61 |
| 3,671,984 | A | * | 6/1972 | Ambrose ........................ 5/402 |
| 3,940,812 | A | * | 3/1976 | DiForti et al. .............. 112/418 |
| 4,664,961 | A | | 5/1987 | Vees et al. |
| 4,711,190 | A | | 12/1987 | Smith |
| 5,098,270 | A | | 3/1992 | Rohn |
| 5,324,462 | A | | 6/1994 | Rohn |
| 5,382,398 | A | | 1/1995 | Draxlmaier, Jr. |
| 6,997,126 | B2 | * | 2/2006 | Murley .................. 112/475.06 |
| 2005/0081770 | A1 | | 4/2005 | Murley et al. |

* cited by examiner

*Primary Examiner*—Ismael Izaguirre
(74) *Attorney, Agent, or Firm*—Raggio & Dinnin, P.C.

(57) ABSTRACT

A seam for use in joining material. The seam having a joint sew line connecting a first and second material. The seam having a cord arranged adjacent to the joint sew line. A stitch line is located adjacent to the cord, wherein the cord forms a predetermined shaped hump on an outer surface of the material.

14 Claims, 2 Drawing Sheets

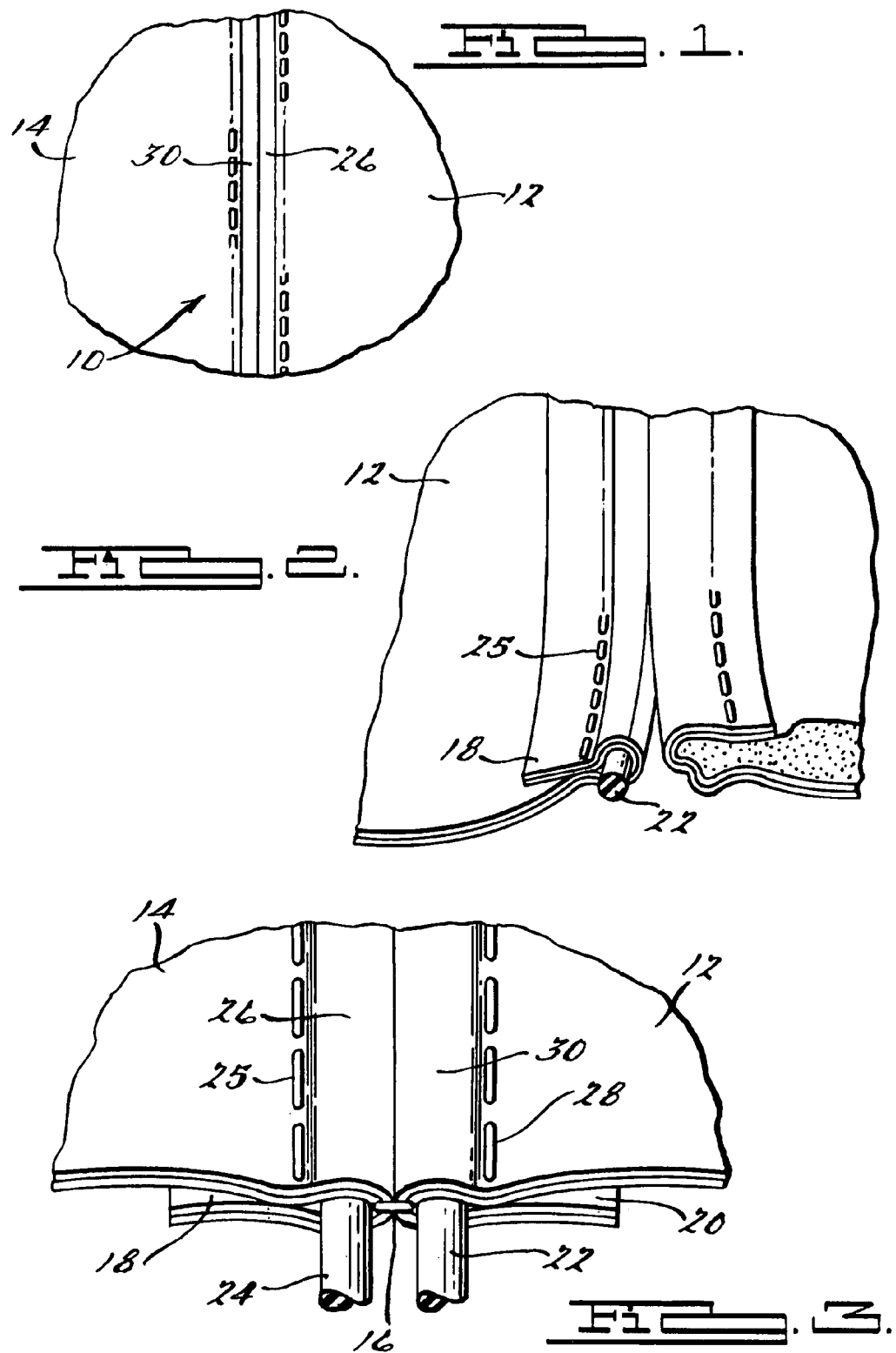

NON-LAMINATE SEAM

TECHNICAL FIELD

The present invention generally relates to upholstery seams, and more particularly, relates to a non-laminate seam for use in an automotive upholstery material which joins two pieces of material with a french seam.

BACKGROUND OF THE INVENTION

Automotive engineers and designers have long sought to create vehicles having aesthetically pleasing exterior and interior designs. Exterior designs have become increasingly uniform over the years. Hence, the importance of uniqueness and aesthetic appeal in the automotive interior has grown. Attractive upholstered coverings for interior trim, seats, and steering wheels are a hallmark of the modern, high quality automobile. Ever-high customer quality demands continue to raise the bar for commercial acceptability, and aesthetic appeal has become paramount in the sale of higher profit margin vehicles. Accordingly, attention has turned to a less traditional element of interior design.

One example of such new focus involves the appearance of seams in upholstered interior components such as seats, headrests, instrument panel pads and the like. Many leather and vinyl top layers of automotive interior parts have simulated exterior stitching that is molded integrally therein. This kind of simulated stitching can only have limited visual similarity to functional stitching, since it necessarily has the same color and appearance as the vinyl top layer with which it is integrally molded. Many current prior art interior surfaces now have a decorative stitching provided by real thread which require visual loops that lay flat on and tensioned against the top layer of the trim part for a desirable appearance and so as to not be pulled out of the trim part during ordinary use of the vehicle. The thread of these prior art seams which form the stitching have relatively thin, tough and incompressible characteristics so as to both properly visually stimulate functional stitching and as to stand up to wear on the surface of the trim part.

One type of prior art seam that is used on many automotive vehicle interior components including seats is a french seam that presents a clean appearance for a joint which joins two pieces of material of a seat together at a secured seam. Prior art french seams are made by applying a foam material to the back side of the leather, vinyl or other types of upholstery by laminating the foam to the back of the upholstery to ensure that the foam is secured to the material. One portion of a first material is then sewn to a portion of the second material. Then the edges are flipped over each other and a seam is placed a predetermined distance from the joint seam to create a french seam look. The french seam gets the appearance from the foam being compressed on itself creating a hump like appearance adjacent to the seam thus creating the french seam look that is desired by many automobile manufacturers.

The creation of a french seam in the prior art is very costly and labor intensive because the foam material has to be laminated to the back side of the material or other components to create the french seam. This reduces productivity and increases the cost of manufacturing the materials for these interior components. Furthermore, the creation of the french seam is complicated and time consuming because of the laminating of the foam to the back of the material. Also the french seam of many prior art materials do not have uniform humps along the entire french seam and create a less than desirable appearance for the french seam in many instances.

Therefore, there is a need in the art for an improved french seam that reduces the cost, is stronger, creates a cleaner and more aesthetically pleasing seam and is easier to manufacture into automotive interior materials.

SUMMARY OF THE INVENTION

According to the present invention, the foregoing and other objects and advantages are obtained by a novel design for an improved french seam for use in upholstered materials for the interior of an automotive vehicle such as a vehicle seat, headrest, and other interior components. The french seam will be created by using a first and second piece of flat stock material that has no backing laminated or applied thereto. Therefore, the french seam will be made as a non-laminate seam. The first and second stock materials will be sewn together at a predetermined distance from each edge thereof by a connection or joint seam. A cord, filament, string, wire, thread, rope or the like will be aligned next to the connection seam. A flap of the first and second materials is then folded over each cord and a stitch line placed along an edge of the cord on both pieces of material being joined. The insertion of the cord will create a french seam that is more aesthetically pleasing, has a cleaner look and creates a straighter and more contoured hump thus creating a more robust french seam. The hump or raised portion of the french seam will be more consistent along its entire length. This will create a low cost and more appealing french seam for automotive manufacturers.

BRIEF DESCRIPTION OF THE DRAWINGS

FIG. 1 shows a top view of a french seam according to the present invention.

FIG. 2 shows an end view of a french seam having one seam according to the present invention and one prior art seam.

FIG. 3 shows a top view of the french seam of FIG. 2.

DETAILED DESCRIPTION OF THE PREFERRED EMBODIMENT(S)

Figure 4:
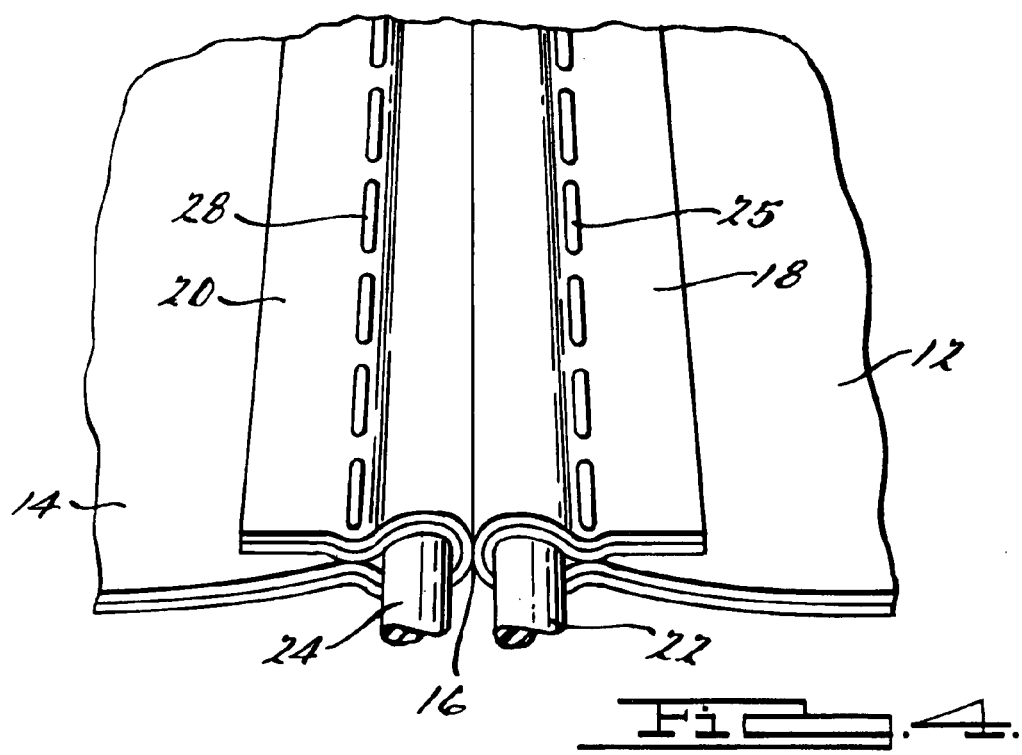
FIG. 4 shows an end and bottom view of a french seam according to the present invention.

Referring to the drawings, FIGS. 1-5 show an upholstery seam 10 manufactured in accordance with the preferred embodiment of the present invention. Broadly, the present invention provides a non-laminate seam 10 for joining adjacent panels 12, 14 of upholstery and in particular is contemplated for use with upholstery panels 12, 14 having a leather, vinyl or imitation leather exterior layer without a foam backing by using the upholstery stock as is. Many prior art panels have an upholstery material with a foam backing layer that is laminated thereto to create a french seam. It should be noted that the french seam according to the present invention can be used on any known upholstery material for use on an interior component of an automotive vehicle. However the preferred upholstery material is a stock material that does not include a foam backing or other backing attached thereto. This will greatly reduce the cost and manufacturing time for the automotive manufacturer.

Figure 5:
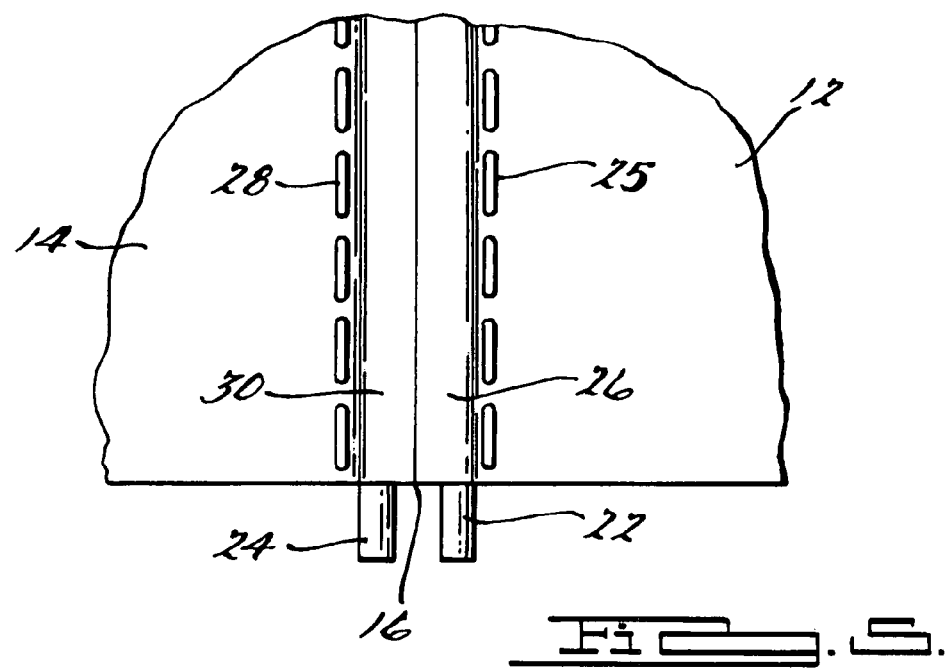
FIG. 5 shows a top view of a french seam according to the present invention.

As shown in FIG. 4 and 5 the first and second panels 12, 14 are joined along a stitching line that is a longitudinal joint or connection sew line 16. It should be noted that the stitching line 16 is made with any known type of thread. The joint sew line 16 is positioned inboard of longitudinal edges of the panels 12, 14 respectively. As used herein the term "inboard" should be understood to mean a direction essential away from longitudinal edges, whereas the term "outboard" refers to an opposite direction toward the edges. Therefore, the joint sew line 16 runs the entire length of the panel 12, 14 along the longitudinal edge. This will leave a predetermined flap edge 18, 20 that will be capable of being folded over to create the french seam look for the upholstered panel 12, 14.

A first and second cord, filament, wire, rope, string, fiber, or the like 22, 24 is arranged adjacent to the joint sew line 16. The flap 18 of the first panel 12 is then folded over the cord 22 and an appropriate stitch line 25 is stitched through a top surface of the upholstered panel 12 and the flap 18. The stitch line 25 is arranged adjacent to the cord or filament 22 such that the cord 22 is encapsulated, surrounded or covered by the upholstery material 12 and creates a predefined hump or knob 26 on the outer surface of the upholstered panel 12. The flap 20 of the second panel 14 of upholstered material is also folded over the second filament 24 which is arranged adjacent to the joint sew line 16. Then a second stitch line 28 is stitched through the second panel 14 and the second flap 20 adjacent to the cord 24 and through the outer surface of the second upholstered material panel 14. This will create a second hump or raised area 30 to complete the look of the french seam between the two adjoining panels 12, 14. It should be noted that the cords 22, 24 are arranged and held in place by the sewing apparatus while they are being integrated into the upholstered material to create the french seam. However, it is contemplated to attach the cords 22, 24 by chemical or other bonding means prior to sewing of the first and second stitch lines 25, 28. The sewing apparatus will have a feed mechanism that will allow for the filaments 22, 24 to be properly aligned during the stitching of the first and second stitch line 25, 28 of the french seam 10. The use of the filaments 22, 24 will create a more uniform and consistent hump 26, 30 giving a cleaner and aesthetically pleasing french seam 10 for the user of the automotive vehicle. The stitch lines 25, 28 may be made with any known type of thread, string, wire, plastic, etc.

It should be noted that the cord or filament 22, 24 may be any type of known material. In the preferred embodiment a plastic material was used, however any other plastic, composite, natural material, fabric, paper, metal, etc., may be used to make the filament 22, 24 to be arranged and located to create the french seam 10 according to the present invention. It should also be noted that the filament 22, 24 is generally of a cylindrical shape having a circular cross section. However, it is also contemplated to use a filament 22, 24 that has any known polygonal cross section, a pentagon cross section, a square cross section, a random cross section, a triangular cross section, a square cross section, a rectangular cross section, or any other known shape depending on the desired shape of the hump or ridge 26, 30 needed for the particular french seam 10 in the particular environment. The french seam 10 can be used on any of the interior components of an automotive vehicle and may even be used for other types of furniture and other devices that join upholstery panels with a non-laminate seam. The ability to create a french seam 10 for the automotive industry without having to laminate a foam backing to the upholstery material will greatly reduce costs and reduce manufacturing time while also creating a more aesthetically pleasing, consistent and uniform french seam 10. The use of the cord 22, 24 will also create a lower price french seam 10 by removing the cost of the foam and glue necessary to laminate the foam to the back of the upholstered material. The cord 22, 24 may also have notches, serrations, etc. therein to allow for a tearable seam which will allow the deployment of an airbag therethrough.

In operation the manufacturing process to create the french seam 10 includes having a sewing machine join the first and second panel 12, 14 with an inboard joint stitch line 16 then properly aligning the first and second cord 22, 24 adjacent to the joint stitch line 16. Next, the first and second flap 18, 20 will be folded over the cords 22, 24 then a first and second stitch line 25, 28 will be sewn adjacent to the cord 22, 24 thus creating the french seam 10 appearance for the exterior of the adjoined panels. The sewing machine may include a feeder system that will feed cord 22, 24 continuously or may include a feeder system that will feed a predetermined length of cord 22, 24 to coincide with that of the length of the adjoining panels 12, 14 being joined together in the french seam 10. A guide on the sewing machine will move along the cord 22, 24 to properly align the seam 10 and keep the stitch lines 25, 28 a predetermined distance from the cord 22, 24 to create a straighter stitch line along the cord 22, 24 thus creating a more aesthetically pleasing and uniform french seam 10 on the outer surface of the upholstered material 12, 14.

Other contemplated embodiments may also be designed and shown from the above mentioned discussion and the attached drawings to include any known designs in the art for such french seams created by using a cord 22, 24 instead of traditional prior art laminated french seams. Therefore, any non-laminate stock material may be used to create the french seam 10 according to the present invention.

While it may be apparent that the preferred embodiments of the invention disclosed are well calculated to fill benefits, objects, or advantages of the invention, it will be appreciated that the invention is susceptible to modifications, variations and change without departing from the proper scope of the invention as shown.

What is claimed is:

1. A seam for use in joining material, said seam comprising:
   a joint sew line connecting a first material to a second material, said joint sew line is positioned a predetermined distance inboard of longitudinal edges of said first and second material, said first and second material having a flap, said flap comprises said first or second material arranged between said joint sew line and said edges of said materials;
   a cord arranged directly adjacent to said joint sew line on an inner surface of one of said materials; and
   a stitch line arranged adjacent to said cord, said stitch line passes through one of said flaps and a surface of one of said materials, said cord forming a predetermined shape on an outer surface of the material.

2. The seam of claim 1 wherein said one of said flaps is folded over and covers said cord.

3. The seam of claim 1 further comprising a second cord and a second stitch line arranged adjacent to said second cord.

4. The seam of claim 1 is a french seam.

5. The seam of claim 1 wherein the seam is used to connect non-laminated materials.

6. The seam of claim 1 wherein said cord extends an entire length of a longitudinal edge of said material.

7. The seam of claim 1 wherein said cord is made of plastic.

8. A french seam for use in connecting first and second non-laminated upholstery panels, said seam comprising:
- a joint sew line positioned inboard of longitudinal edges of the first and second panel, said joint sew line forms a flap for each panel, said flag is defined as a portion of the panel between said joint sew line and said edge of the panel;
- a cord aligned directly next to said joint sew line on an inner surface of the first panel;
- a second cord aligned directly next to said joint sew line on an inner surface of the second panel;
- a stitch line placed along a length of said cord, said stitch line passes through said flan of the first panel and a surface inboard of said joint sew line of the first panel; and
- a second stitch line placed along a length of said cord, said second stitch line passes through said flap of the second panel and a surface inboard of said joint sew line of the second panel.

9. The seam of claim 8 wherein one of said flaps is folded over and covers said cord.

10. The seam of claim 9 wherein said stitch line extends an entire length of said cord.

11. The seam of claim 8 wherein said second cord and said second stitch line contacting the second panel, said cord and said stitch line contacting the first panel.

12. The seam of claim 11 wherein said cords are made of plastic.

13. A method of sewing a french seam to connect a first and second upholstery panel, said method including the steps of:
- joining the first and second panel with an inboard joint sew line;
- aligning a first and second cord directly adjacent to said joint sew line;
- folding one flap of one of the panels over one of said cords and the other flap of the other panel over the other of said cords; and
- sewing a first and second stitch line adjacent to and along a length of said cords, respectively.

14. The method of claim 13 further including the step of feeding and holding said cords with relation to the panels and a sewing machine.

* * * * *